Figure 1:
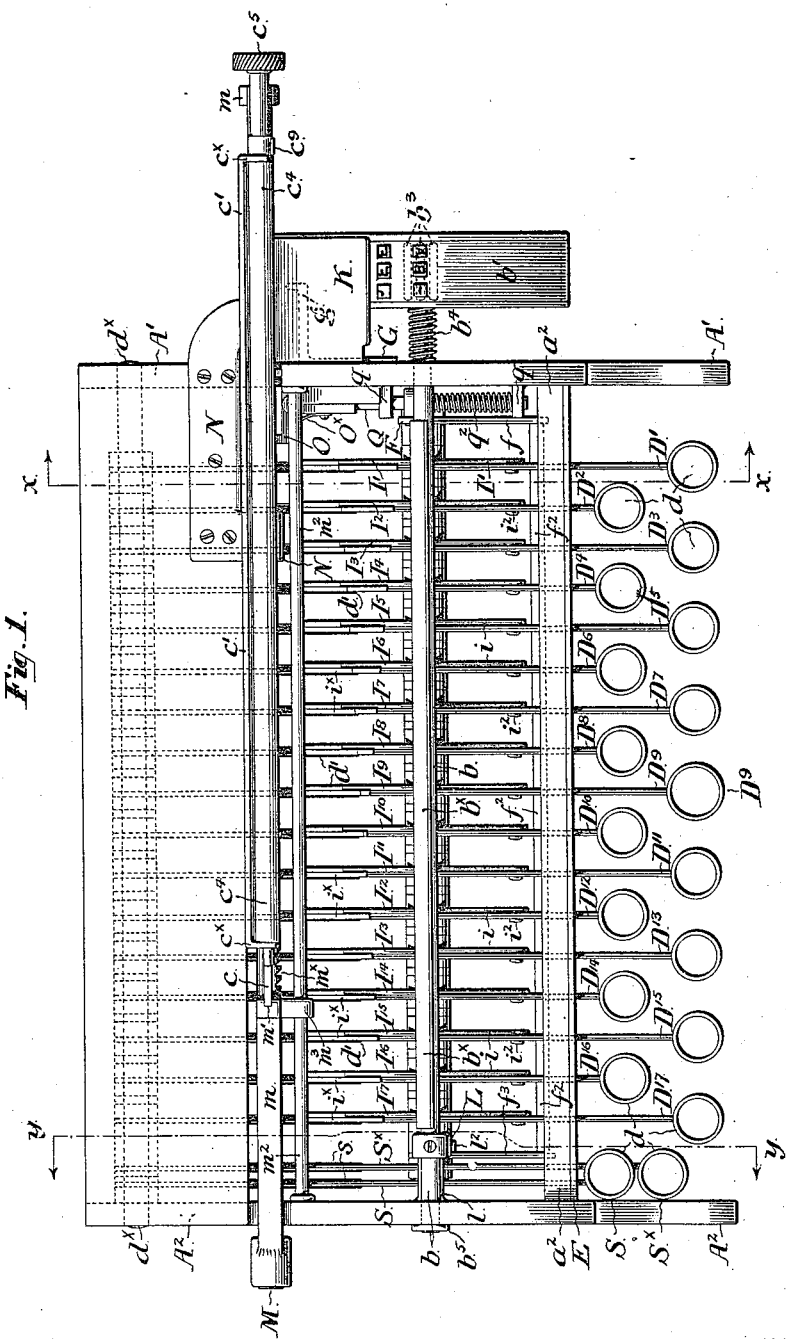

(No Model.) 14 Sheets—Sheet 1.
J. W. SCHUCKERS & M. O. REHFUSS.
TYPE WRITING MACHINE.

No. 441,198. Patented Nov. 25, 1890.

WITNESSES: INVENTOR (No Model.) 14 Sheets—Sheet 2.
J. W. SCHUCKERS & M. O. REHFUSS.
TYPE WRITING MACHINE.
No. 441,198. Patented Nov. 25, 1890.
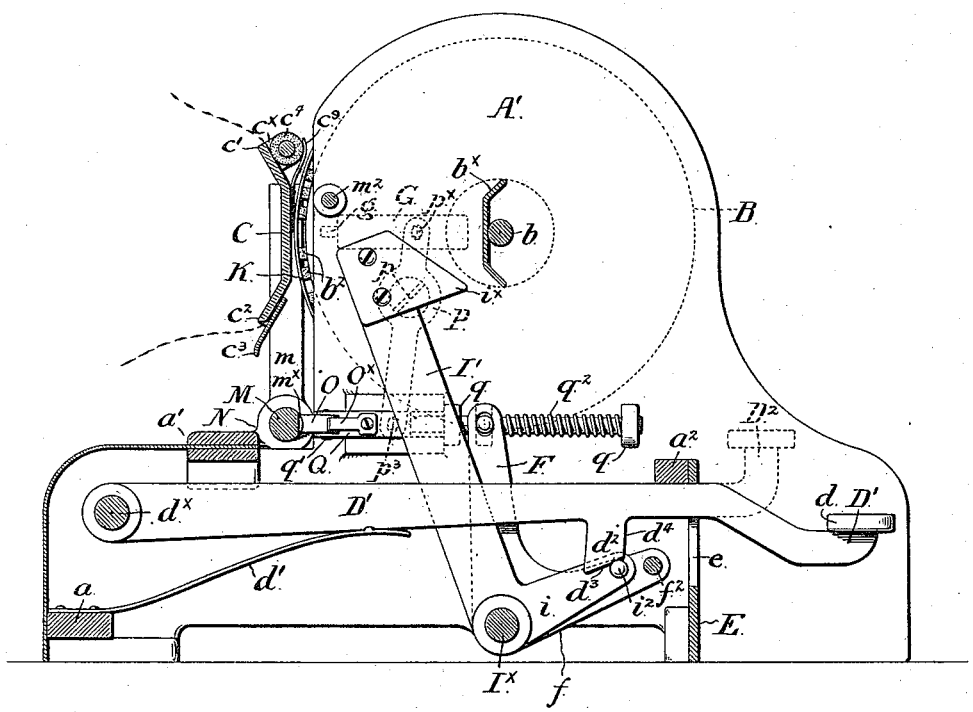
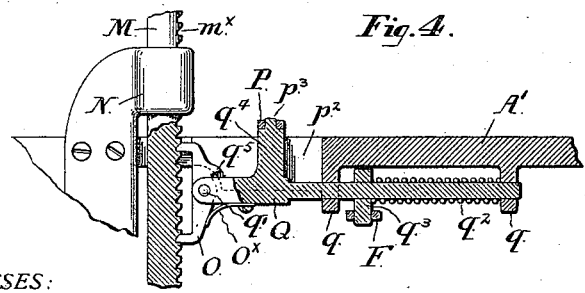
WITNESSES: INVENTORS (No Model.) 14 Sheets—Sheet 3.
J. W. SCHUCKERS & M. O. REHFUSS.
TYPE WRITING MACHINE.
No. 441,198. Patented Nov. 25, 1890.
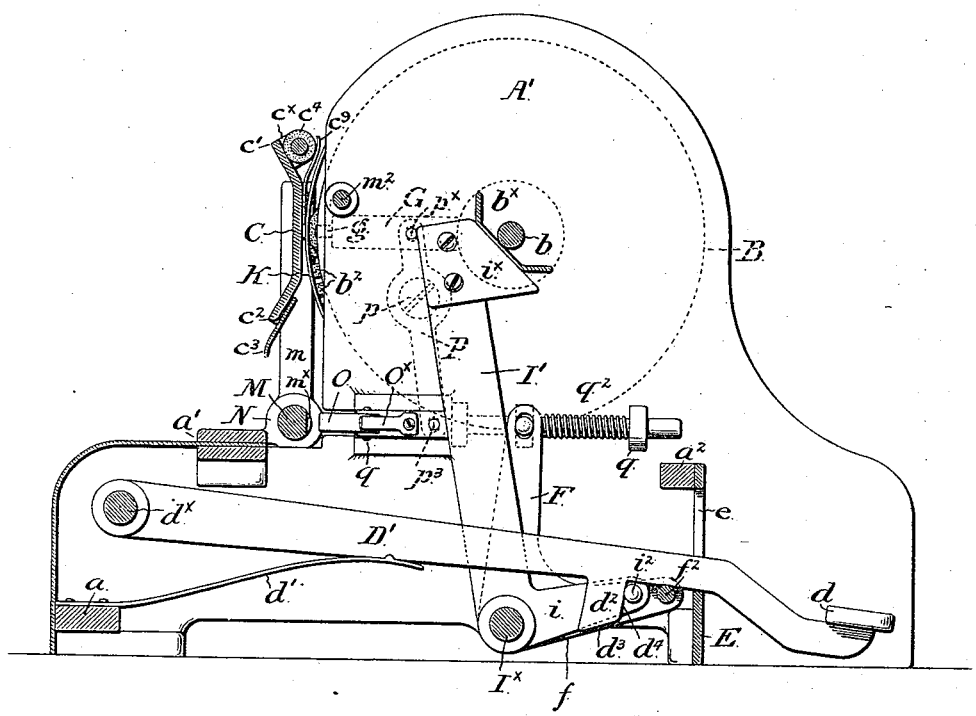
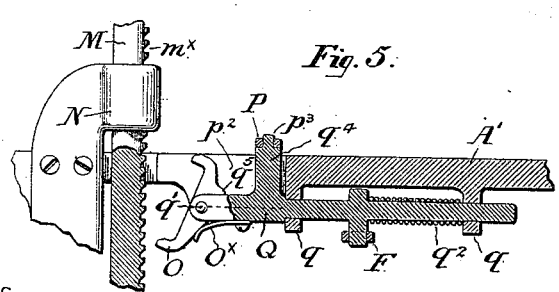
WITNESSES:
John J. Bradley
INVENTORS
Jacob W. Schuckers
Martin O. Rehfuss (No Model.) 14 Sheets—Sheet 4.

J. W. SCHUCKERS & M. O. REHFUSS.
TYPE WRITING MACHINE.

No. 441,198. Patented Nov. 25, 1890.

WITNESSES:
John J. Bradley

INVENTORS
Jacob W. Schuckers
Martin O. Rehfuss (No Model.) 14 Sheets—Sheet 5.

J. W. SCHUCKERS & M. O. REHFUSS.
TYPE WRITING MACHINE.

No. 441,198. Patented Nov. 25, 1890.

WITNESSES:

INVENTORS

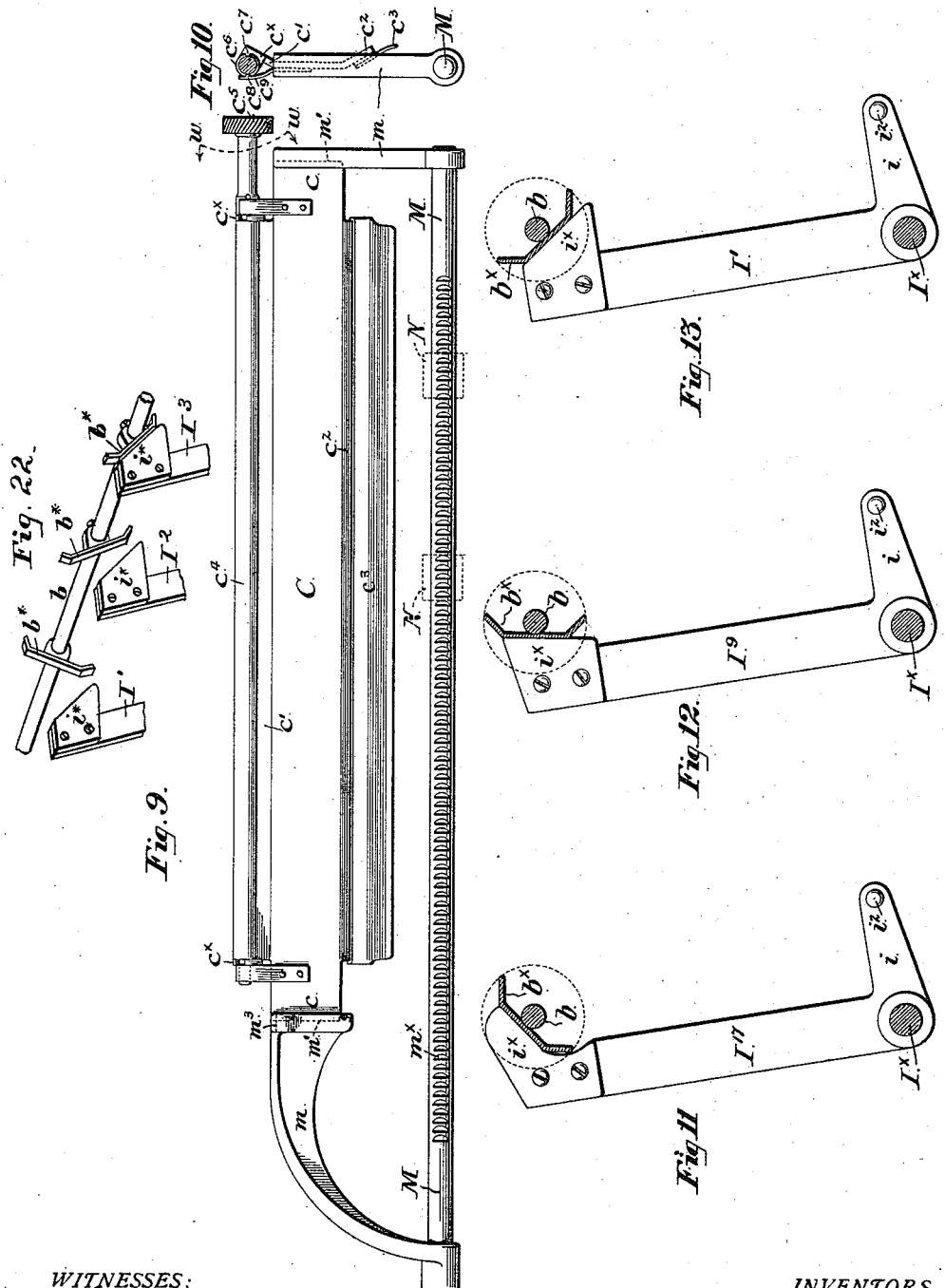

(No Model.) 14 Sheets—Sheet 7.
J. W. SCHUCKERS & M. O. REHFUSS.
TYPE WRITING MACHINE.

No. 441,198. Patented Nov. 25, 1890.

WITNESSES:
INVENTORS (No Model.) 14 Sheets—Sheet 8.

J. W. SCHUCKERS & M. O. REHFUSS.
TYPE WRITING MACHINE.

No. 441,198. Patented Nov. 25, 1890.

WITNESSES:
John J Bradley

INVENTORS
Jacob W. Schuckers
Martin O. Rehfuss (No Model.) 14 Sheets—Sheet 9.

J. W. SCHUCKERS & M. O. REHFUSS.
TYPE WRITING MACHINE.

No. 441,198. Patented Nov. 25, 1890.

WITNESSES:
John J Bradley

INVENTORS
Jacob W. Schuckers
Martin O. Rehfuss (No Model.) 14 Sheets—Sheet 12.

J. W. SCHUCKERS & M. O. REHFUSS.
TYPE WRITING MACHINE.

No. 441,198. Patented Nov. 25, 1890.

WITNESSES: INVENTORS (No Model.) 14 Sheets—Sheet 14.
J. W. SCHUCKERS & M. O. REHFUSS.
TYPE WRITING MACHINE.

No. 441,198. Patented Nov. 25, 1890.

WITNESSES:
John J. Bradley

INVENTORS
Jacob W. Schuckers
Martin O. Rehfuss

UNITED STATES PATENT OFFICE.

JACOBS W. SCHUCKERS, OF NEWARK, NEW JERSEY, AND MARTIN O. REHFUSS, OF PHILADELPHIA, PENNSYLVANIA, ASSIGNORS, BY DIRECT AND MESNE ASSIGNMENTS, TO THE ESSEX TYPEWRITER COMPANY, OF WEST VIRGINIA.

TYPE-WRITING MACHINE.

SPECIFICATION forming part of Letters Patent No. 441,198, dated November 25, 1890.

Application filed August 13, 1889. Serial No. 320,553. (No model.)

*To all whom it may concern:*

Be it known that we, JACOBS W. SCHUCKERS, a citizen of the United States, residing in the city of Newark, county of Essex, and State of New Jersey, and MARTIN O. REHFUSS, a citizen of the United States, residing in the city and county of Philadelphia, and State of Pennsylvania, have jointly invented certain new and useful Improvements in Type-Writing Machines, of which the following is a specification.

The object of our invention is the production of an inexpensive, simple, and durable type-writing machine; and to such end our invention comprehends certain improved devices and combinations of devices which together constitute an organized machine of novel character, a good form of a convenient embodiment of which is represented in the accompanying drawings and hereinafter described, the particular subject-matter claimed as novel being hereinafter definitely specified.

This invention is an improvement upon each of two type-writing machines heretofore invented by the aforesaid Jacobs W. Schuckers, application for patent upon the first of which was filed in the United States Patent Office upon the 11th day of May, 1889, as Serial No. 310,393, and application for patent upon the second of which was filed upon the 2d day of July, 1889, as Serial No. 316,308.

The present invention embodies features of both of the said inventions of the said Schuckers, and to the applications upon them reference is to be made for the better understanding of these improvements. Apart, however, from referring to these applications it is proper to explain that in Shuckers' first machine referred to there were employed a series of movable keys, a corresponding series of slide-bars or travelers, to any one of which the movement of the corresponding key imparted movement, and which travelers were provided with deflecting-arms of varying inclination, one of which was applied to and moved with each of the said travelers, a shaft which was within the range of the movement of all and adapted to be turned or deflected by any one of said deflecting-arms, a type-wheel upon and rotatable with said shaft, a platen with respect to which the type-wheel had movement in order to present its types thereto, a type-hammer which occasioned the radial outward movement of a given type and to which the movement of a given key imparted movement, a platen-carrier, and connective mechanism between the type-hammer and platen-carrier, which occasioned the predetermined advance of the platen-carrier, and, further, proper to explain, that Schuckers' second machine was a simplification of his first in that it employed fewer parts, and especially in that it contained no travelers, but was so organized that the keys operated directly upon the wheel-shaft without the intervention of travelers. In both of these machines it was of the essence of the invention that the wheel-shaft to which the type-wheel was connected should, upon the depression of a key, be rotated to a given extent in one or the other direction, either, in the first machine, by the contact with it, through the intervention of a position-plate applied to it and a deflecting-arm applied to the traveler, of a traveler, or else, in the second machine, by the contact with it, through the intervention of a position-plate applied to it, of a key, the traveler being dispensed with. In both of these machines, moreover, a type-striking hammer was, through connective mechanism, caused by the depression of the key to strike a type after the shaft and wheel had been rotated to bring that type into position before the platen, and thereby cause its imprint upon the paper across the platen, and in both a platen-actuating or paper-feed mechanism was so connected with both the keys and the hammer mechanism as to occasion the longitudinal advance or feed of the paper and platen after each stroke of the key.

In the present invention, as in both of those referred to, we make use of a type-wheel and wheel-shaft connected therewith and of a position plate or plates upon said shaft, and also make use of keys, a platen, a hammer or type-striking mechanism, and a platen-feed mechanism, both of which latter are, through connective mechanism, actuated from said keys; but instead of providing travelers having deflecting-arms of varying inclination to act upon the position-plate, and themselves actuated by keys, or of providing keys which, without the intervention of travelers, themselves make contact with position-plates upon the wheel-shaft, we now employ a series of levers, which we term "position-levers," which have edges, surfaces, or inclines of varying angular inclinations and which subserve the purpose of Schuckers' deflecting-arms, and which levers are, respectively, as to their inclines or striking-faces, adapted to make contact with a position plate or plates upon the wheel-shaft, and in consequence to impart given predetermined rotations to said shaft and wheel, and employ in connection with such series of levers a corresponding series of keys, which may either themselves be levers or be direct-acting slide-bars, as in the Schuckers second invention referred to, and the depression of any one of which occasions not only the actuation of a corresponding position-lever, but also, through any preferred form of connective mechanism, which *per se* is not of the essence of our invention, the actuation of the type-striking mechanism and of the platen-feed, both of which are essentially the same as the corresponding mechanisms described as forming part of both of the Schuckers inventions, but especially of his first. The broad idea, then, of the present invention being the employment of levers to occasion the positioning of the type-wheel for the presentation of given types, it will be apparent to a mechanic familiar with writing-machines and advised of the construction of the Schuckers machines that it is possible to apply the principle of the lever in a great variety of embodiments, and also to occasion its throw or deflection by keys of various constructions and applications, preferably, perhaps, in the form of co-operative levers.

With these considerations in view, and in order the better to emphasize the fact that it is the application of the lever generic and not the lever specific which, so far as the position-lever goes, constitutes the essence of this invention, we have illustrated in the accompanying drawings and hereinafter described five different applications of position-levers alike embodying our invention, and in connection with and operative of them four applications of lever-keys and one application of slide-bar keys alike embodying our invention, so far as that invention resides in the application of keys to the actuation of position-levers, and also, in order similarly to emphasize the immateriality of the specific connective mechanisms, have illustrated and described several forms of appropriate connective or action mechanisms adapted to be actuated by the keys and to actuate both the type-striking and the platen-actuating mechanisms or either of them.

Figure 6:
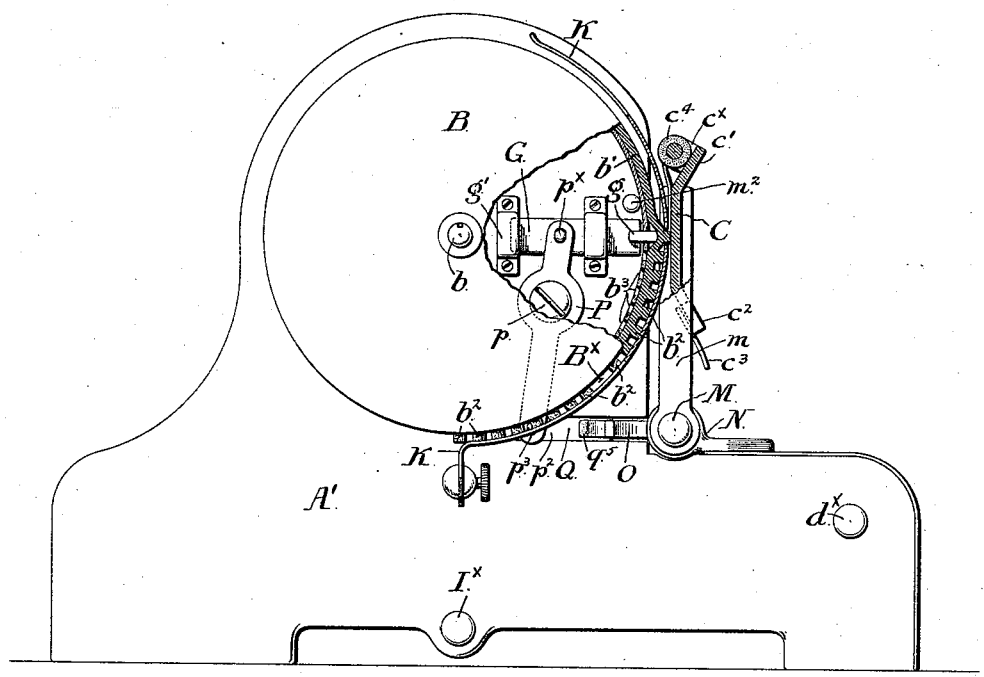
Figure 7:
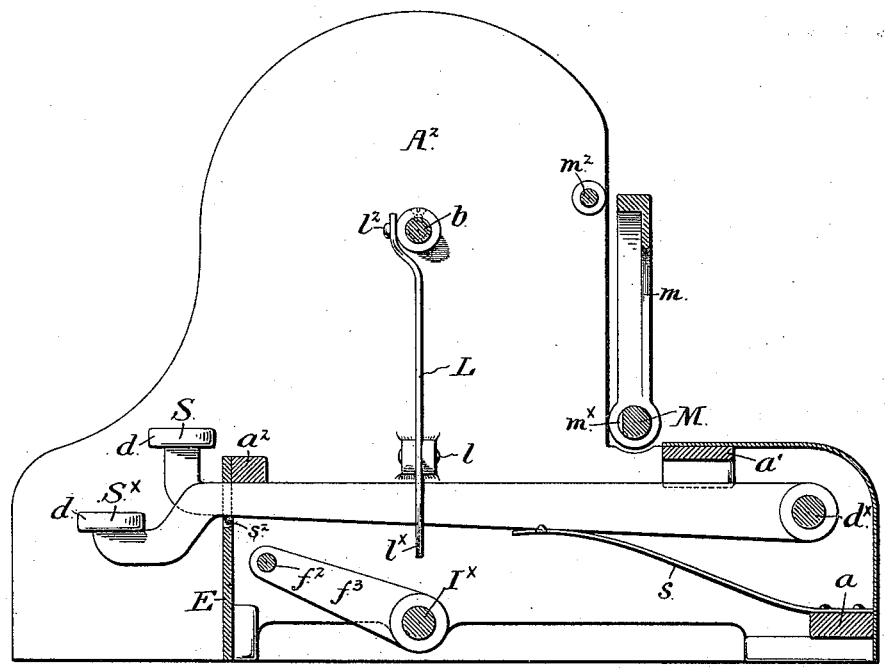
Figure 8:
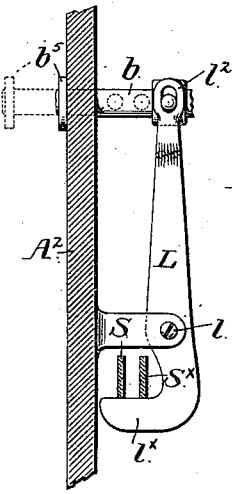

In the drawings, Figure 1 is a top plan view of a machine embodying our invention, the parts being supposed at rest or in the position represented in Fig. 2. Fig. 2 is a transverse sectional elevation through the machine of Fig. 1 in the plane of the dotted line *x x* upon said figure, and sight being taken in the direction of the arrows upon said line, and the parts being represented in their position of rest. Fig. 3 is a similar view of the same parts in the position which they occupy when the key has been depressed. Figs. 4 and 5 are fragmentary sectional plans in a central horizontal plane through the pawl-carrier and a portion of the base-bar of the platen-carrier, exhibiting one of its bearings, especially illustrative of the rack-and-pawl connection between the platen-carrier and the pawl-carrier, and in Fig. 4 illustrating the position of the pawl during the impression of the type, and in Fig. 5 its position when disengaged from the rack. Fig. 6 is a right-hand end elevational view of the machine represented in Fig. 1, a portion of the platen-carrier being broken away to exhibit the platen in vertical transverse section, and a portion of the type-wheel being similarly broken away to similarly exhibit the application of the hammer-slide and the action of the hammer in striking a type. Fig. 7 is a transverse sectional elevation through the machine in the plane of the dotted line *y y* of Fig. 1, and sight being taken in the direction of the arrows upon said line, the view being especially designed to exhibit the application of the shifting keys and lever and the lever-rocker of the action-lever bail. Fig. 8 is a front elevational detail of the shaft-shifting lever, the frame-plate to which it is applied and the shifting-keys being shown in section. Fig. 9 is a front elevational view of the platen-carrier and platen; Fig. 10, a right-hand end elevational view of the same, sectional in planes of the dotted line *w w* upon said figure. Figs. 11, 12, and 13 are side elevational views of different position-levers removed from the machine, illustrative of various inclinations on each side of the vertical of the deflecting-plates with which said levers are provided. Figs. 14 and 15, 16 and 17, 18 and 19, and 20 and 21 are respectively, by couples, transverse sectional side elevations, respectively, by couples, corresponding to the views of Figs. 2 and 3, of four modified constructions alike embodying our invention and differing only formally from the construction illustrated in the first thirteen figures of the drawings. The special features of modifications represented by these views are hereinafter at length described. Fig. 22 shows a modified arrangement of the inclined faces of the deflecting and position plates.

Similar letters of reference indicate corresponding parts.

Referring now first to the construction represented in Figs. 1 to 13, inclusive, of the drawings, which together represent a good form of machine embodying our improvements, the frame-work of the machine is essentially and most conveniently composed of two parallel, erect, transverse end frame-plates A' A², being standards conveniently connected by longitudinal tie-bars $a$ $a'$ $a^2$ $a^3$ or kindred connective devices. The frame-plates, which are preferably counterparts, are preferably, also, cast webs of the form shown in Figs. 2, 3, 6, and 7, and they, together with their tie-bars and either with or without a base-plate, preferably constitute the entire frame-work of the machine, which, as will be apparent, is exceedingly simple and inexpensive. The types $b^2$ of the machine are arranged in circumferential series upon and preferably project from the periphery of a type-wheel B, to which movement of partial rotation in either direction is imparted in order to bring a particular type in front of a platen C, disposed in approximate tangency to said type-wheel. The type-wheel is, in a manner hereinafter described, mounted conveniently, but not necessarily, to the right side of the right frame-plate A', upon the projecting extremity of a shaft which I term the "wheel-shaft" $b$, which extends longitudinally of the machine in a horizontal plane and has its bearings in the two frame-plates, through both of which it passes. It is obvious that rotary movement imparted to the wheel-shaft will likewise be imparted to the type-wheel, which is fixed thereon to rotate therewith, and that according to the extent and direction of the said rotary movement of the shaft will be the movement of the wheel.

The organization so far as described is essentially that of both of Schuckers' former machines. The movement of the shaft and wheel is, through the intervention of the position-levers, controlled by the movement of the keys, of which keys any suitable series is employed, and all of which serve to impart a movement to said shaft and wheel. For the sake of clearer illustration I have in the accompanying drawings represented but seventeen keys, the finger-knobs $d$ of which are arranged in a double bank or tier. It is, however, to be understood that any desired number of such keys may be employed, and that, if desired, but a single bank or more than two banks may be employed.

The keys are designated by the letters D' to $D^{17}$, inclusive, and as they are all (except as to the double-bank arrangement of their finger-knobs very clearly represented in Figs. 1, 2, and 7) precisely alike a description of one will be sufficient. Selecting, then, key D', (shown in Figs 1, 2, 3, and 13,) the key consists of a lever of the second order, to which the letter D' is applied, it being preferably a blank of metal of the form shown in the drawings, terminating in a finger-knob $d$, the upper face or pressing-surface of which is provided with a letter, number, or other character correspondent to the type which said key controls. The key in question, as well as all the other keys in the series, is at its rear extremity mounted upon the key-axis $d^\times$, being a fulcrum-rod horizontally disposed in parallelism with the wheel-shaft $b$, common to all the keys, and having its bearings at its extremities in the frame-plates. Near its forward extremity, but to the rear of the finger-knob, the key in question passes through and is engaged within a vertical slot or way $e$, being one of a series of slots or ways for the series of keys formed in a key-rail E, extending from frame-plate to frame-plate conveniently by being applied to the tie-bars $a^2$ $a^3$. These ways serve to limit the up-and-down movement of the lever-keys with respect to their axis, and also serve to stay said keys against lateral sway.

The depression of the keys is due to the pressure of the finger of the operator, while their elevation is conveniently accomplished by a series of key-springs $d'$, preferably sprung from and attached to the tie-bar $a$, and at their free ends bearing beneath the keys in advance of their fulcrum $d^\times$. Each key near its forward extremity is formed with a depending key-lug $d^2$, conveniently integral by being struck from the same blank with the key itself, although, if desired, separately attached, the lower face of which is inclined downwardly and backwardly to form the lug-incline $d^3$, which at its upper front end runs into a vertical straight face $d^4$. The key-lugs of all of the keys correspond in profile as to their lower inclines and front straight faces.

The key-lugs respectively serve as to their inclines to encounter and depress and as to their straight faces to slip past and descend without further encounter against lever-lugs $i^2$, laterally projecting from the heels $i$ of the position-levers, of which levers a series, (designated as to their body portions I' to $I^{17}$,) corresponding in number with the number of keys, is in the construction represented employed. All of these position-levers, which are in the form of right-angular cranks composed of a heel portion $i$ and a body portion, to which the designation I' to $I^{17}$, as the case may be, is, as stated, applied, are at their crotches fulcrumed upon a lever-axis $I^\times$, common to them all and extending between the frame-plates, to which its extremities are fixedly connected in parallelism with and in the construction discussed in alignment below the wheel-shaft $b$. Each position-lever is at the upper extremity of its body portion provided with an angular deflecting-plate $i^\times$, being preferably a flat-faced lug, plate, or bar either struck out from the blank of metal which preferably forms the position-lever proper or else, as shown, separately applied thereto, which plates are all, in the forward movement of the position-levers, adapted to encounter and come to a close and firm bearing against a preferably flat-faced lug, plate, or bar, which we term the "position-plate" $b^\times$, carried by the wheel-shaft, and being in fact a flattened peripheral portion or attachment of said shaft, which shaft is within the range of the movement of all of said deflecting-plates, and which in the construction illustrated, or where the shaft is of small diameter, is extended in the form of a tangential plate, so as to present a broad bearing-surface to the faces of the deflecting-plates, which latter in their forward movement into encounter with it (the said position-plate) turn it and come to a close and firm bearing upon it, as shown in the case of the arm D', represented in Fig. 3.

The inclination of the plate-striking face of each deflecting-plate differs from that of every other similar plate of the series, and, inasmuch as in the construction discussed the position-plate extends the required length of the wheel-shaft in a given single plane and is common to all the deflecting-plates of all the position-levers, it will be apparent that each deflecting-plate in encountering and coming to a bearing upon said position-plate will cause the latter to assume a different angular position and consequently will cause the wheel-shaft and type-wheel to assume a different position circumferentially considered, and will therefore occasion the presentation to the platen of different types upon the periphery of the wheel.

The inclination of the plate-encountering face of each deflecting-plate is intentionally such as in the encounter of a given plate with the position-plate to occasion such an inclination of said position-plate and such a consequent rotation of the type-wheel as will bring into position opposite the platen the letter, number, or character upon said wheel which corresponds to the letter, number, or character upon the key operating in connection with the given position-lever and deflecting-plate.

The normal set of the position-levers and keys being that represented in Fig. 2, or one in which the levers are inclined backward and the keys are elevated, and one in which the key-lugs $d^2$ rest as to their inclines upon the lever-lugs $i^2$, it will be apparent that a depression of any key will be accompanied first and until the incline has slipped off the lever-lug by a depression of the heel of its position-lever and the forward deflection of the body of said lever until its deflecting-plate encounters, rotates, and comes to a fixed bearing against the position-plate upon the wheel-shaft, and will then, so soon as this has been accomplished and by virtue of the proportions of the incline of its key-lug and the relation of the said incline to the lever-lug, be further accompanied by a slipping of the straight face of its key-lug past and along said lever-lug, as shown in Fig. 3, without further effect upon the position-lever as an entirety, and with the result only of the further descent of said key accompanied by its encounter with and by the deflection of the action-lever, whereof hereinafter. The movement of the shaft and wheel is therefore, as will now be clearly understood, entirely controlled by the keys through the intervention of the position-levers described.

The types preferably extend circumferentially over a segment from ninety to one hundred and fifty degrees, and therefore but a comparatively short rotation of the type-wheel will be required to bring any particular type into position, and in consequence, therefore, the required inclinations of the deflecting-plates will be correspondingly small, and may be within the range of the extremes respectively represented in the views of detached position-levers represented, respectively, in Figs. 11 and 13 of the drawings. In practice between the extreme reverse inclinations of the deflecting-plates of said figures any number of intermediate inclinations may, as will be apparent, be applied to the deflecting-plates of additional intermediate position-levers employed.

Although, of course, automatic provision may be made for returning the type-wheel to a given normal set or position of rest with reference to the platen, and devices for the purpose are described in the Schuckers applications referred to, we find it possible to dispense with them and to permit the wheel and shaft to remain in the position which the depression of a given key has caused them to assume, providing only, for the purpose of spacing, a spacing-key, being in Fig. 1 the key $D^9$, operative upon a position-lever, being the position-lever $I^9$, Fig. 12, the deflecting-plate of which possesses such inclination as in its contact with the position-plate to occasion the bringing opposite the platen of that portion of the periphery of the type-wheel which we term the "spacing-gap" $B^\times$, Figs. 2 and 6, and which is a portion of the type-band, either provided with an opening or formed without projecting types.

That which we have designated the "action-lever" F, Figs. 1, 2, and 3, is the device through the medium of which, in the construction represented and under discussion, the movement of the keys is transmitted to the platen-actuating and type-striking mechanisms, and it is a lever of the first order, being a right-angular crank, conveniently of the form shown, which is similar to that of the position-levers, having a body portion, to which the letter F is applied, and a heel portion (designated $f$) fulcrumed conveniently upon the axis $I^\times$ of the position-levers in proximity to the right-hand frame-plate. From the front extremity of the heel of this action-lever extends horizontally a lever-bail $f^2$, which passes in parallelism with the lever-axis $I^\times$ beneath the front portions of all of the keys to the extreme left-hand of the machine, and is there connected with the free front extremity of a lever-rocker $f^3$, Fig. 7, being a counterpart of the heel of the action-lever, and like that heel sprung from the lever-axis $I^\times$.

It should be remarked that it is convenient to key both the action-lever and the lever-rocker to the lever-axis I^x, to mount that axis at its extremities free for oscillatory movement in bearings in the frame-plates, and either to provide the crotch portions of the position-levers with hubs and mount them free for oscillatory movement upon said oscillatory axis, or else, without providing them with hubs, to similarly mount them and separate them from each other by washers, as shown in Fig. 1. Features of this character are, however, within the province of the constructor.

It will now be apparent that all of the lever-keys are in their descent, and after the inclines of their respective key-lugs have slipped past their respective lever-lugs, adapted to encounter the bail of the action-lever, and by depressing said rod to occasion the forward movement of the body of the action-lever for the throwing into action with the rack of the platen-carrier of the pawl-carrier Q and its pawl, as hereinafter set forth—an action which, as will be apparent, does not take place until after the throw of the position-lever and the rotation of the wheel-shaft and type-wheel.

The type-wheel B is, as stated, provided as to a portion of its peripheral face with radially-projecting types $b^2$, which are caused to make their impress upon the paper or other material upon the face of the platen C by being pressed or forced from within radially outward against the same conveniently by the action of a hammer $g$, connected with a hammer-slide G, mounted in a slide-bearing $g'$, conveniently affixed against the outside face of the right-hand frame-plate, which is set to strike against the back of the types from within or inside of the rim of the wheel, and so to force the type struck outwardly and toward the platen. The hammer $g$ is, as shown in the drawings, connected with the rear extremity of its slide, while said slide itself is adapted to be moved horizontally forward or back by a pawl-lever P, conveniently pivoted against the inside face of the right-hand frame-plate by a pivot $p$, at its upper extremity connected with said slide by a pivot-pin $p^x$ and at its lower extremity connected with the pawl-carrier Q, whereof hereinafter. The normal set of the hammer and hammer-slide is such that the hammer is normally back from the inside face of the rim of the wheel, such position being conveniently effected by a retracting-spring of any preferred character, (as, for instance, $g^2$, Figs. 18 and 19,) but being preferably effected by the platen-actuating devices hereinafter referred to.

As will be understood from a consideration of the connection of the action-lever with the pawl-carrier and of the pawl-carrier with the hammer-slide through the pawl-lever, the hammer-slide will not be advanced to duty—that is to say, moved to strike—until after the rotation of the type-wheel and until the commencement of the retreat of the pawl-carrier. From this relationship of parts there necessarily results the bringing of a particular type into position with respect to the platen before the striking of such type to make its impress.

In order that the types may be susceptible of a radially in-and-out movement with respect to their carrying type-wheel, many modes of mounting or attaching them may be resorted to. We find it convenient to form upon or apply to the external or peripheral face of the type-wheel a band of rubber $b'$, out of the substance of which are formed or to which are applied the types $b^2$; and to form one or more circumferential openings or slots, which we term "hammer-slots," $b^3$ entirely through the rim of the wheel, so as to expose from within the said rim the back or under face of said type-carrying band. Through the slot or slots so formed the striking extremity of the hammer in the striking movement of said hammer passes and comes in contact with the rear face of said type-band, with the result of forcing the portion of the band encountered and the type which that portion of the band carries forward against the platen. Upon the retraction of the hammer the band, which under its impulse was bellied out, by virtue of its own elasticity resumes its normal set. Of course, if desired, the types may be otherwise applied, as set forth in Schuckers' first application referred to.

In the application of the type-carrying rubber band we find it convenient, as fully set forth in said application, to provide the wheel with three parallel circumferential rows of types, in connection with which the single hammer is adapted by the lateral shifting of the wheel to do duty. This lateral or sidewise shifting of the wheel in order to bring a given row of its types into range of contact with the hammer we can accomplish by the following devices, it being of course understood that the hammer is normally in range of one of the rows of types, and that therefore but two sidewise shifts of different extent are requisite: The wheel-shaft to which the type-wheel is keyed, being adapted to have longitudinal or end-for-end play within its bearings within the frame-plate, is provided between the outer face of the right-hand frame-plate and the inner face or hub of the type-wheel with a shaft-spring $b^4$, being a spiral spring encircling it, and with collar $b^5$, which spring and collar normally serve to maintain the shaft and wheel in the position represented in Fig. 1. Pivoted against the inside face of the left-hand frame-plate by means of a pivot-pin $l$ is a shifting-lever L, Figs. 7 and 8, the lower extremity of which is inturned to form a heel $l^x$, upon which rest the extremities of shifting-keys S S^x, Figs. 1 and 7, normally maintained in the position represented in Fig. 7 by springs $s$ and being similar to the lever-keys and conveniently fulcrumed upon the same axis $d^x$. These keys are stopped or otherwise controlled by being passed through vertical lever-ways $s^2$, Fig. 7, of different depths, to impart throws of different extent to the shifting-lever, the upper extremity of which is, by means of the slot-and-pivot connection $l^2$, Figs. 7 and 8, connected with the left-hand extremity of the wheel-shaft, and the deflection of which in consequence imparts, according to its extent, a proportionate end-for-end throw or shift of the wheel-shaft. The wheel being normally maintained, as in Fig. 1, in that position to the extreme right which occasions the presentation of its left-hand row of types, which are those most frequently used, to the action of the hammer, it will be apparent that the shifts of the wheel are inward, or to the left hand, accompanied by the compression of the shaft-spring, and maintained only during the depression of the shifting-keys, upon the release and spring ascent of which the wheel-shaft will resume its normal position. In the construction represented one of the shifting-keys will bring the second hammer-slot of the type-wheel in range of the hammer, while the other key will bring the third slot in range of said hammer, the first slot being, as stated, normally in range.

The foregoing is, of course, but one of many arrangements for shifting the shaft to which a mechanic would naturally resort.

The foregoing arrangement of a series of parallel circumferential rows of types upon the face of the type-wheel is, as explained in the Schuckers first application, one of convenience merely, and one which enables us to compress within the compass of a short arc of the type-wheel a large number of types. Of course, if desired, more or less than three rows of type may be employed, and, obviously, a single row will effectuate the invention, although it will necessitate long rotary throws of the type-wheel.

In order, if desired, to provide the type-wheel with alphabets of different fonts of type, it is easy to divide the circumference of said wheel into two, three, or more segments, each of which shall contain an alphabet of a given font, style, or character of type, and to so apply the wheel that it can be adjusted with respect to its circumferential set upon its shaft.

K, Figs. 1, 2, 3, and 6, is a segmental inking-pad so set that in the rotative movement of the type-wheel it serves to supply ink to the faces of the types. It is supported as convenience of manufacture may dictate, preferably from the right-hand frame-plate in the manner shown in the figures mentioned. The pad is, of course, either made in two parts or provided with a transverse slot or opening in the region facing the platen, so as not to interfere with the printing action of the types. It is manifest that the pad K is, moreover, simply one of many contrivances which may be employed for inking the types, and that it is equally possible to ink them by rollers or other well-known devices, and also possible and even preferable to dispense with all such devices and employ an inking-ribbon, as commonly used in writing-machines.

Having now explained the devices by which the types are selected and brought into action against the platen, it is proper to state that in connection with them platens of various character and actuated to the requisite movement by various contrivances may be employed.

The following contrivances, which are in substance the same as those set forth in the Schuckers first application with slight modifications of form, arrangement, and application, are convenient for the purpose.

M is what I term the "platen-carrier," the same being composed of a base-bar, preferably of circular cross-section, and to which the letter M is applied, having upright end arms $m$, one of them preferably curved, as shown, which is mounted for longitudinal travel in either direction by being as to its base-bar engaged with platen-bearings N, which are preferably sleeves fixed with respect to the frame-work conveniently by being connected with or formed as a part of the tie-bar $a'$, as shown in Figs. 1, 2, 3, 6, and 7, and by being guided by a carrier guide-rod $m^2$, which is in effect a tie-bar of the frame, and with which a carrier-sleeve $m^3$ or other boxing or guide conveniently connected with the curved upright arm $m$ of the carrier is engaged. The base-bar of the platen-carrier has upon its front face a rack $m^x$, and its arms $m$ are each provided with a vertical slot $m'$, to which are respectively adapted the respective extremities $c$ $c$ of the platen C, so that said platen can be easily dropped into its carrier in such manner as to become temporarily a part thereof or be easily lifted from out it.

The longitudinal predetermined travel of the platen-carrier and platen is occasioned by the action of an intermittently-operated pawl O, hereinafter described. The platen is preferably provided with angular top and bottom edges $c'$ $c^2$, between which and its face (designated by the letter C) is a flat surface, against which the paper or other writing material lies flat and which receives the thrust or stroke of the types. The extremities of the top edge of the platen are inturned to form or otherwise conveniently provided with lugs or ears $c^x$, which respectively, by being perforated, serve as the journal-bearings for a feed-roller $c^4$, applied between the ears of the top edge of the platen and conveniently provided with a thumb-knob $c^5$, by the manual rotation of which it (the said feed-roller) may be rotated in order to occasion the feed of the paper upon the platen transversely across the face of said platen. The bottom edge of the platen is overlaid by a closely-applied tension-strip $c^3$, secured only at the extremities, but set so as to bear quite closely against said bottom edge and just admit the passage of the paper between the two. Of course, if desired, this strip may be adjusted by springs or otherwise to cause it to bear with equal effect upon paper of different thicknesses. The feed-roller and the tension-strip both, therefore, bear closely against the edges of the platen, and together these devices serve to maintain the surface of the paper taut against the face of said platen. The tension-strip will preferably be extended below the platen, as shown, to form a table to receive the edge of the paper. The feed-roller is conveniently rubber-faced, so as to insure the requisite bite upon the paper.

In order to gage the transverse feed of the paper across the platen, we find it convenient to provide the feed-roller near the thumb-knob $c^5$ with a guttered gage-disk $c^6$, the gutters $c^7$ of which are simply transverse notches employed in any desired series, into which successively enters and engages a lug $c^8$ on the extremity of a feed-roller spring $c^9$, secured, as shown in Figs. 9 to 10, to the platen.

It is obvious that the foregoing contrivance will automatically serve to guide the touch of the operator in his manual rotation of the feed-roller, and thereby conveniently and accurately secure a predetermined advance of the paper.

The longitudinal intermittent travel of the platen and platen-carrier (in the arrangement under discussion from the right to the left hand of the machine) is conveniently secured by the action of a pawl O against the rack-provided face of the base of the platen-carrier.

The pawl is connected with the pawl-carrier, already referred to as being operated by the throw of the action-lever in the operation of the keys, and is conveniently constructed, arranged, and operated in the following manner:

Q, as already explained, is the pawl-carrier, the same being a slide-bar housed for endwise movement, preferably in a horizontal plane and from front to rear of the machine, in slide-bearings $q$, conveniently affixed to the inside face of the right-hand frame-plate. To the rear portion of this pawl-carrier is, by a vertical pivot $q'$, pivoted the double-toothed platen-pawl O, which is provided with a pawl-spring $O^\times$, conveniently affixed at its front extremity to the pawl-carrier, and which as to its rear extremity exerts its influence against the back face of the pawl to normally maintain it in the position shown in Fig. 5. The front portion of said pawl-carrier is conveniently encircled by a carrier-spring $q^2$, which abuts between a shoulder $q^3$ on the carrier and the front carrier-bearing $q$, which serves as a resisting-abutment on the frame-plate. The rear portion of the pawl-carrier is, as shown in Figs. 4 and 5, provided with a lateral arm $q^4$, which extends outwardly through an opening $p^2$, formed in the right-hand frame-plate, and is beyond the outside face of said frame-plate pivotally connected by means of the slot-and-pivot connection $p^3$ with the lower extremity of the pawl-lever P, already described as being at its upper extremity pivotally connected with the hammer-slide. It will now be obvious that whenever under the throw of the action-lever F, occasioned by the depression of a key, the pawl-carrier is advanced toward the front of the machine, and its pawl in consequence retracted from the rack, the hammer-slide and hammer will, through the pawl-lever, be forced to the rear of the machine and be caused to strike the type-band, and further obvious that upon the release of the key, the consequent release of the action-lever, and the ensuing retreat or recoil of the pawl-carrier, accompanied by the platen-carrier-feeding action of its pawl under the expansion of its previously-compressed spring, the pawl-lever will be reversely deflected and the hammer-slide and hammer retracted from the type-band and moved toward the front of the machine.

The normal position of the parts above referred to at rest is that shown in Fig. 2, in which position the pawl-carrier and pawl occupy the position shown in Fig. 4. The position of the same parts at the instant of the completion of the full depression of a key is that represented in Figs. 3 and 5. It will therefore be apparent that during the period of the impression of the type upon the paper the platen-carrier will be at rest and the platen-pawl turned angled into position necessary for the engagement of its inside tooth with the next succeeding rack-tooth, in order to insure the requisite subsequent advance of the platen-carrier upon the retreat from the wheel of the hammer-slide under the release of the key and consequent redeflection of the pawl-lever under the influence of the expansion of the pawl-carrier spring.

From a consideration of the foregoing mechanism it will be apparent that each stroke or depression of a key is accompanied by a predetermined longitudinal advance of the platen, and consequently by a predetermined longitudinal feed of the paper transversely across the type-face of the type-wheel. Of course the depression of the spacing-key $D^9$ will in the construction discussed be accompanied by the operation of the action-lever, the platen-feed, and the type-striking mechanisms; but, while the feed of the platen is of course in such case desired, the striking of a type by the hammer which is not desired is, as already explained, obviated by causing the position-lever operative in connection with the spacing-key to bring into position in front of the platen the spacing-gap $B^\times$ of the type-wheel, or that portion of its type-carrying band which is unprovided with a type, and the outward radial thrust of which portion is consequently without effect upon the paper. Of course the spacing-gap may be constituted simply by an opening through the rim of the wheel not covered by the type-band.

In order, if desired, to provide the type-wheel with alphabets of different fonts of type, it is easy to divide the circumference of said wheel into two, three, or more segments, each of which shall contain an alphabet of a given font, style, or character of type, and then to so apply such wheel that it can be adjusted with respect to its circumferential set upon its shaft.

It is preferable to arrange the keys in a double bank, staggering or alternating them by keys of the respective banks and making the keys of the front bank slightly lower than those of the rear—an arrangement easily accomplished, as shown, by shortening the alternate keys which constitute the upper bank. It will be understood that by the application of the shifting-keys already referred to it is possible to cause a given key to do duty for the same letter in both upper and lower case, or for given letters and given punctuation-marks or numerals. If desired, the type-wheel and the type-striking and platen-actuating mechanisms may be applied at the left-hand instead of at the right-hand side of the machine. If desired, moreover, the type-striking and the platen-actuating mechanisms may, respectively, accordingly to the set of the type-wheel, be applied to either the inside or the outside of either frame-plate, while, as is also obvious, any suitable paper carrying and supporting cage or rack may be connected with the platen-carrier to insure the support of the paper. Expedients of operation of this character are obvious to those skilled in the use of this class of machinery. It is likewise apparent that changes in the detail and arrangement of the mechanical construction of the various intermediate or connective mechanisms and of the minor parts can be resorted to without departure from the invention broadly as such and as we have endeavored to explain it.

From the foregoing description the construction and operation of the machine represented in the first thirteen figures of the drawings will now be sufficiently understood.

Figure 14:
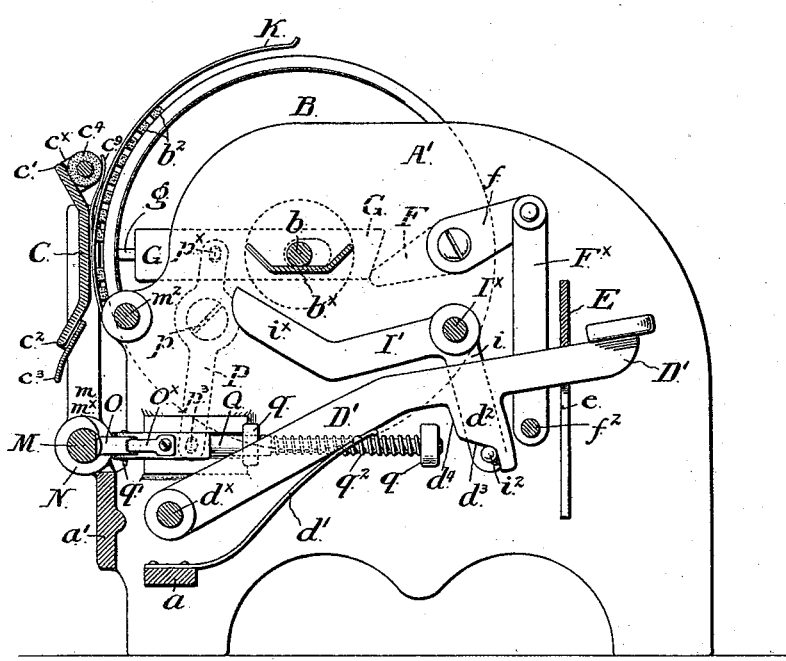
Figure 15:
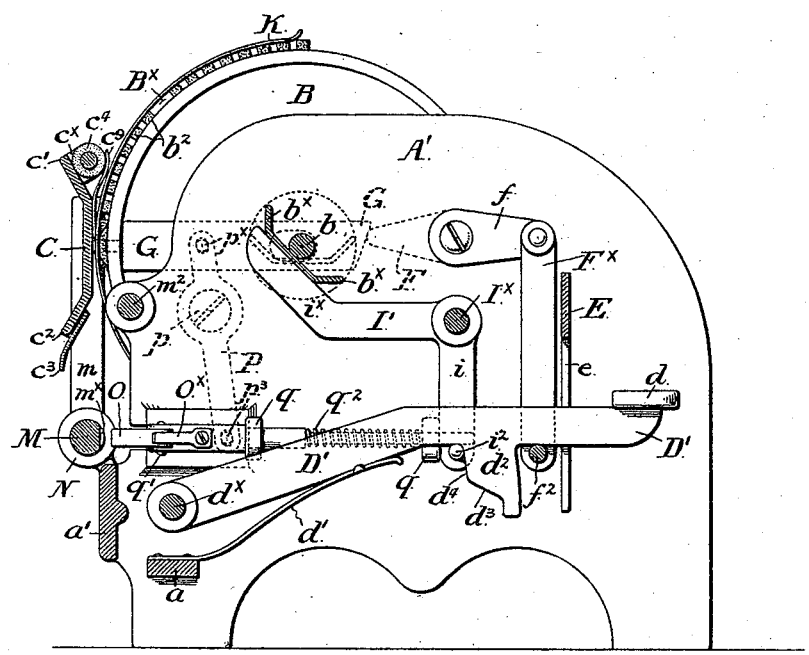

Referring then, secondly, to the various modified constructions illustrated in Figs. 14 to 21, inclusive of the drawings, we have in Figs. 14 and 15 represented a modified construction in which the form of the lever-keys and position-levers is slightly altered, and in which the action lever is likewise of modified form. Thus, to be more specific in this modified construction, the position-lever I' is turned upside down, and its deflecting-plate $i^{\times}$ is formed integral with it and adapted to encounter the position-plate $b^{\times}$ from beneath instead of from behind, while the lever-axis $I^{\times}$ is above and not below the keys, and the heel $i$ of the lever therefore depends instead of springing upward and forward. Thus again the key-lug $d^2$ of the key D' is formed with its incline $d^3$ and its straight face $d^4$ both facing rearwardly and making contact with the lever-lug $i^2$ to the rear and not to the front. Thus again the action-lever F is adapted to its heel portion, or that portion which is designated by the letter $f$ in the drawings, to be acted upon by the key through the intervention of a depending link $F^{\times}$, which supports at its extremity the lever-rocker rod $f^2$, upon which the keys directly act, while its body portion, to which the letter F is applied, assumes the form of a toe, which is adapted to encounter the inclined rear face of the hammer-slide G, and so, upon the depression of the key, the pulling down of the link, and the consequent deflection of the lever, to propel the said hammer-slide rearwardly to duty against the types. In this arrangement the hammer-slide G and the pawl-carrier Q are, as in the first-described construction, connected by the pawl-lever P, and the action-lever F, although it acts upon the hammer-slide and not upon the pawl-carrier, therefore occasions the same mutually-opposite reciprocation of these two elements as in the construction first herein described.

In Fig. 14 the parts of the machine thus as above modified are represented in the normal position of rest, while in Fig. 15 they are represented as in the position which they occupy when the key has been depressed, the position-lever and action-lever thereby operated and the hammer-slide and platen-carrier in consequence reversed.

Figure 16:
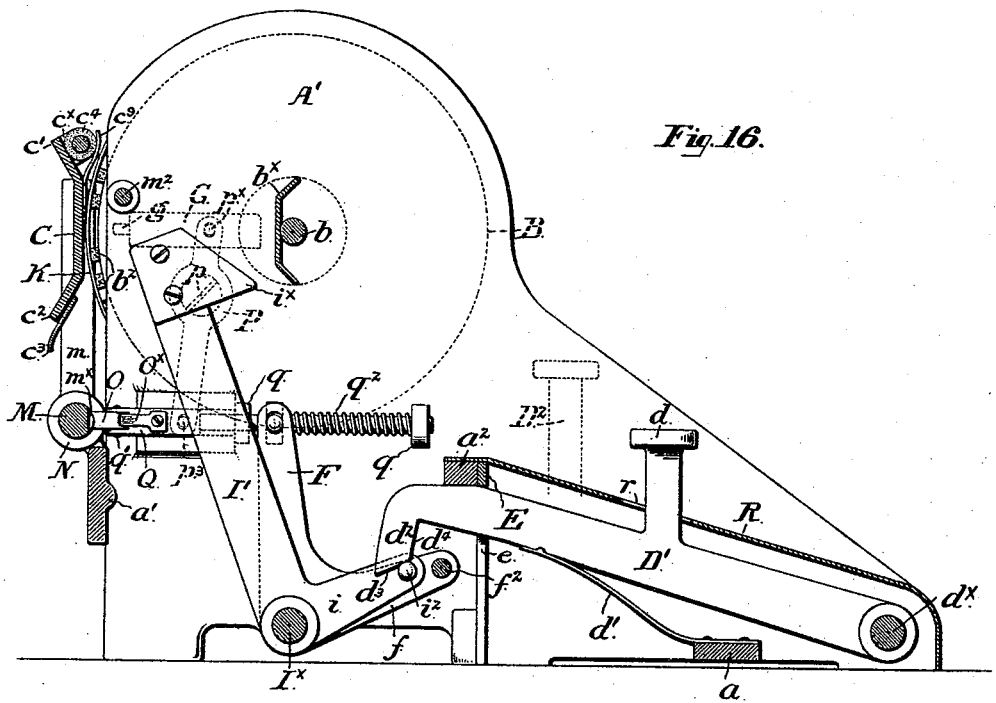
Figure 17:
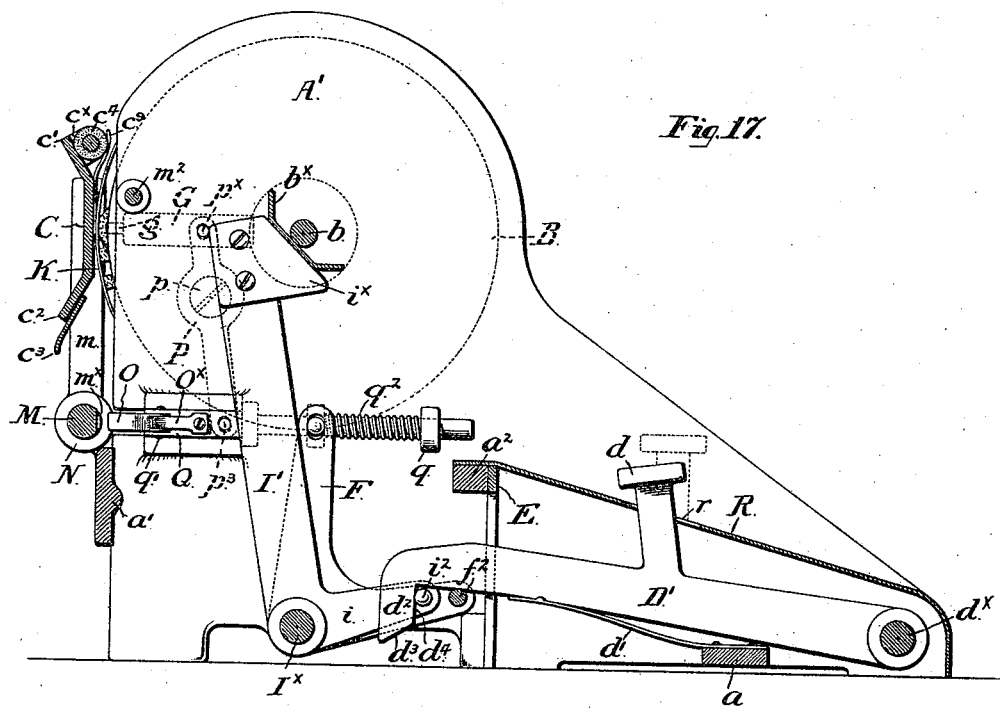

Referring now to the modification illustrated in Figs. 16 and 17, it will be apparent that the gist of the variation from the construction of the machine first described is simply in the mode of application of the lever-keys D', which, as will be apparent, are reversed in position—that is to say, are mounted upon a key-axis $d^{\times}$, arranged across the front portion instead of the rear portion of the frame-work, which latter is in the outline or contour of its frame-plates correspondingly modified. In this construction the finger-knobs $d$ spring from an intermediate portion of the keys, while the key-lugs $d^2$ are at the extreme inner or free end of their keys. In other particulars than the foregoing the construction is identical with that of the machine first described. As a matter of convenience the entire set of keys are covered by a box R, having slots $r$, through which the finger-knobs project. The position of rest of the parts is manifestly that shown in Fig. 16, while the position after the depression of a key is that shown in Fig. 17.

Figure 18:
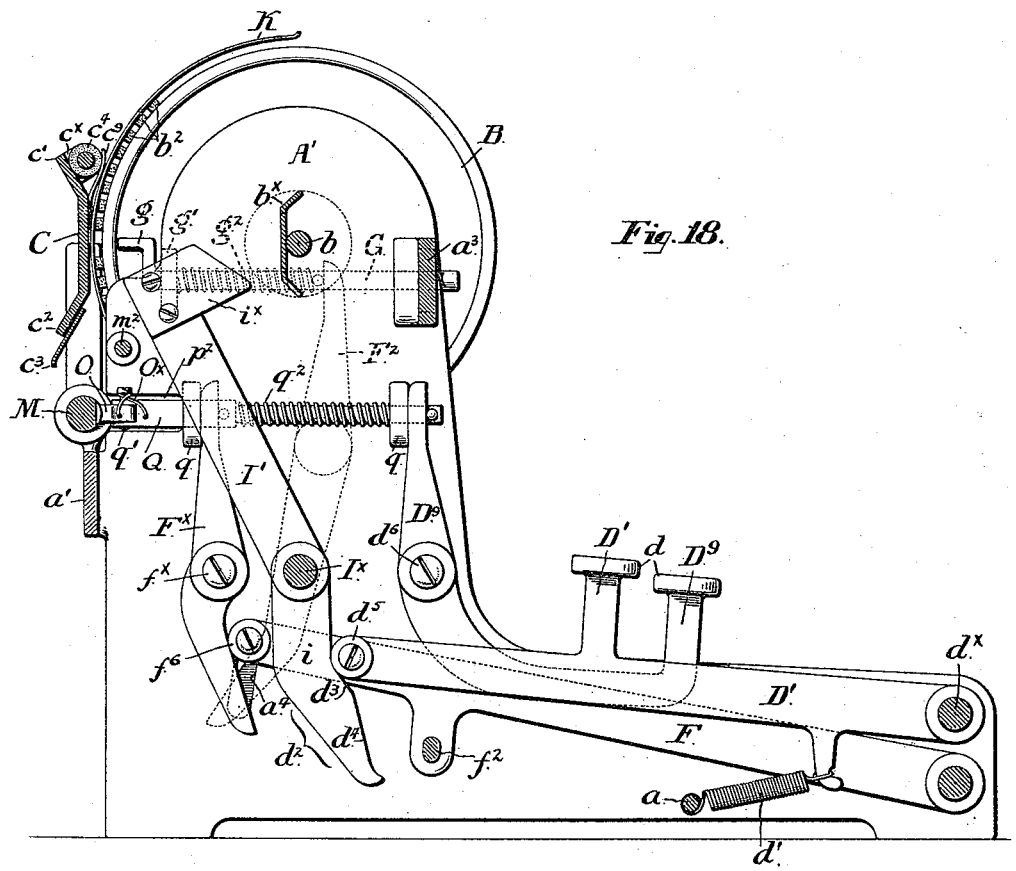
Figure 19:
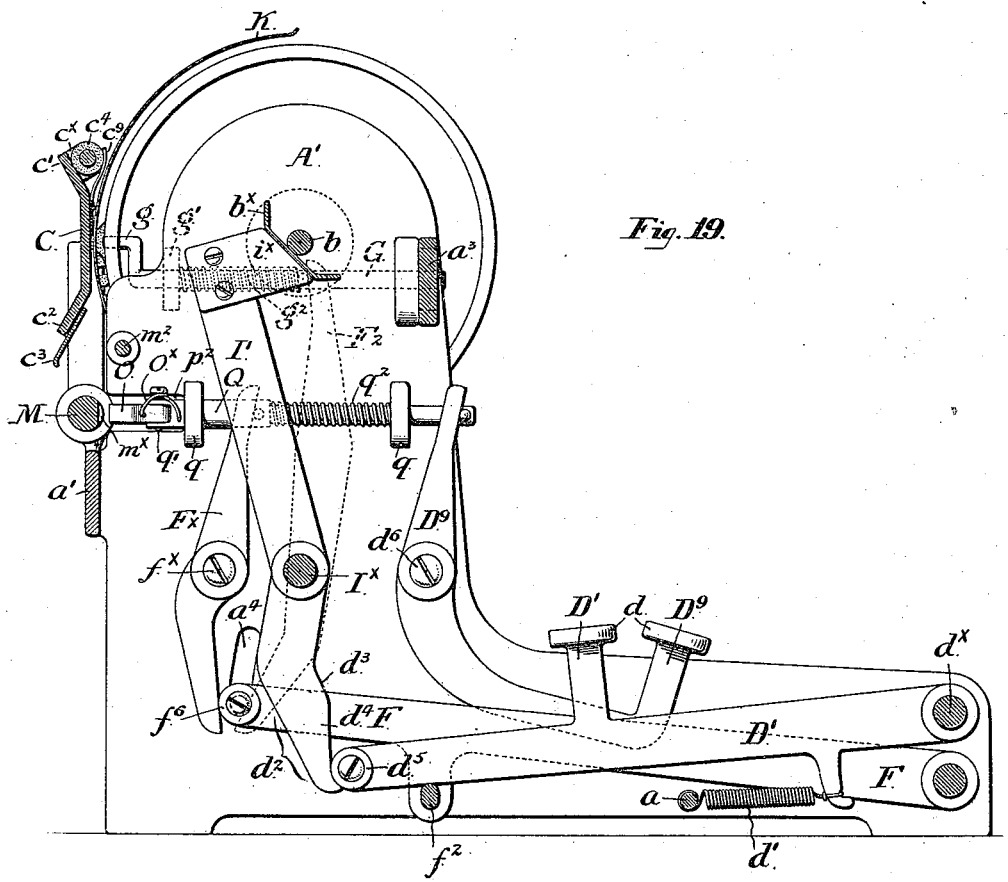

In Figs. 18 and 19 is represented a further modification in the construction of our machine, in which the lever-keys D' are, as in the construction of Figs. 16 and 17, fulcrumed at the front instead of at the rear of the machine, in which each key-lug $d^2$ is formed upon the heel $i$ of a position-lever I', and not upon the corresponding key itself, and in which contact with said lug is made by the inner extremity of said key, which is conveniently provided with a roller $d^5$, set to normally bear against said incline, and in the depression of the key by traveling against said incline to cause the forward deflection of the body of the position-lever, and then by traveling down the straight face, as in Fig. 19, to permit of the operation of the action-lever F when the key encounters the bail $f^2$ of said lever, (or, rather, levers, for there are two, counterparts of each other, at opposite sides of the machine, between which extends and to both of which is connected the bail in question.) The action-lever F being in this construction a lever of the third order, and not, as in the previous constructions, a lever of the first order, it is necessary, in order to effectuate its connection with the pawl-carrier Q, to compound it with an auxiliary action-lever $F^\times$, being a lever of the first order pivoted in a vertical position at $f^\times$, as to its upper portion pivotally connected with said carrier, and as to its lower portion adapted to be encountered by the inner extremity of said action-lever proper F, which extremity is conveniently provided with a friction-roller $f^6$.

In the foregoing construction it is obvious that the depression of a key will first be accompanied by the deflection of its position-lever, then after such deflection is complete by the depression of the action-lever, accompanied by the movement of the pawl-carrier to the front of the machine and the retraction of its pawl from the rack of the platen-carrier. Although, of course, in this construction it is competent for us to connect the pawl-carrier and the hammer-slide by such a pawl-lever as has been shown and described in connection with the forms already set forth, it is likewise possible to employ in connection with the hammer-slide a supplemental action-lever $F^2$, being a lever of the first order vertically erected conveniently against the opposite side face of the frame-plate from that against which the auxiliary action-lever $F^\times$ is pivoted, and the lower extremity of which makes contact with a pin, roller, or other lateral projection from the rear extremity of the action-lever, which passes through a roller-slot $a^4$, formed in the frame-plate. The result of this construction is, the lower extremities of the auxiliary and supplemental action-levers being reversed, as shown in the drawings, that upon the descent of the roller-provided inner end of the action-lever the said lower extremities are spread apart and into the position shown in Fig. 19, the upper extremities of both levers being caused to approach, with the result that the hammer-slide is forced inwardly to duty and the pawl-carrier and pawl retracted from the rack. The return of the pawl-carrier is, as in the other constructions, effected by the pawl-carrier spring $q^2$, while the return of the hammer-slide is in like manner effected by the application to said slide of a hammer-spring $g^2$. In this construction the spacing is conveniently accomplished by providing a special spacing-key $D^9$, being a lever of the first order, the lower extremity of which is provided with a finger-knob and designated by the letter $D^9$, which is curved backwardly and upwardly past its pivot $d^6$, and is then as to its upper extremity pivotally connected with the rear extremity of the pawl-carrier. By this application it is possible, the hammer-slide and hammer remaining inert, to, by a depression of the key, retract the pawl from the rack, and then by releasing said key to, under the recoil of the pawl-carrier spring, secure the feed of the pawl. In this construction we have also illustrated the application of a spiral spring $d'$ to effect the elevation of the key as a substitute for the flat spring represented in the other constructions.

The parts of the machine of the foregoing modified organization are in Fig. 18 represented in the position which they occupy when at rest, and in Fig. 19 in the position which they occupy when a key has been depressed.

Figure 20:
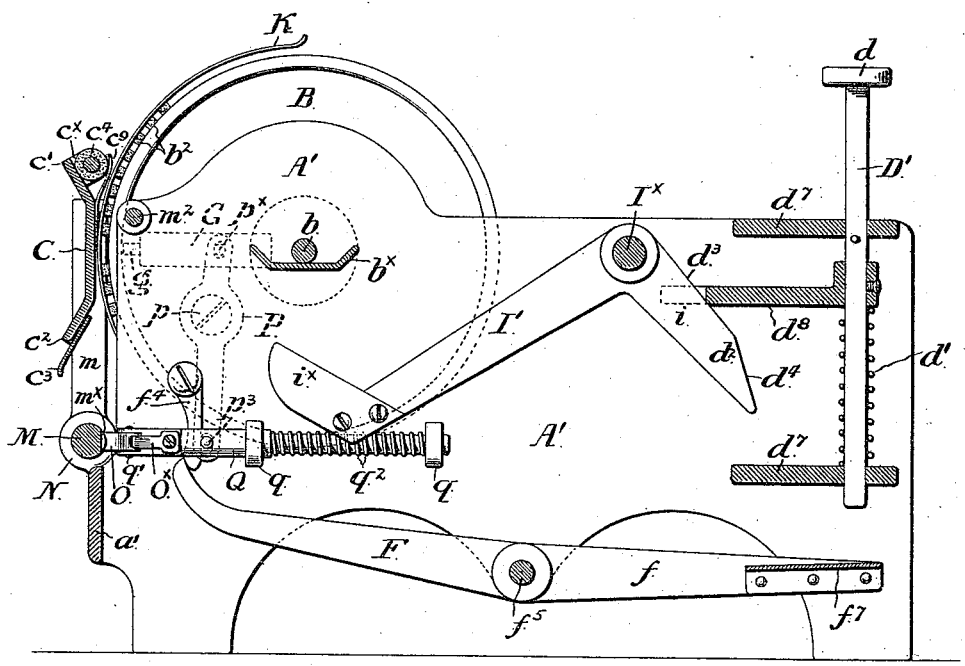
Figure 21:
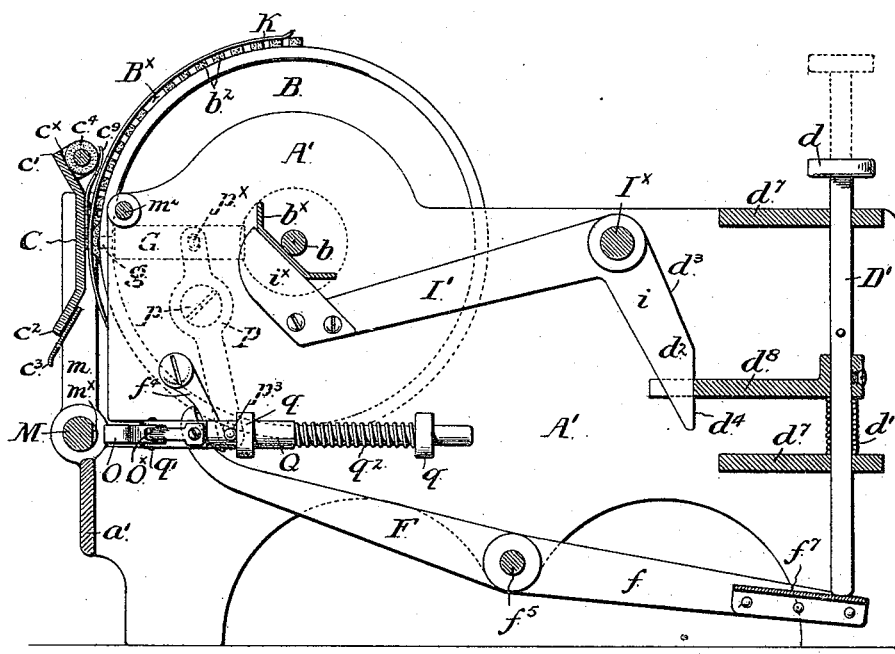

In Figs. 20 and 21 is represented still another modification in the construction of our machine, in which the keys, instead of being formed as levers, are formed as direct-acting slide-bars $D'$, housed for vertical movement in suitable key-rails $d^7$, forming part of the frame-work, adapted to be maintained in their elevated position by spiral or other springs $d'$, applied as shown, and provided with rearwardly-projecting fixed arms $d^8$, adapted to encounter key-lugs $d^2$, formed, respectively, upon the heels of the position-levers $I'$, and not upon the projecting arm or body of the keys themselves. In this construction the encounter of the projecting arm of a key is, first, with the incline $d^3$ of the key-lug until, in the depression of the key, the arm has passed completely over said incline, with the result of the deflection of the position-lever until its deflecting-plate has made contact with and rotated the position-plate upon the wheel-shaft, and, second, with and downward along the straight face $d^2$ of said lug until, by the time when such downward traverse has been completed, the body of the key will have descended upon and depressed a heel-plate $f^7$, carried by the forward extremity of an action-lever of the first order, pivoted at $f^5$ at the base of the machine, and by such depression of said plate will have occasioned the deflection of said action-lever, with the result that its body portion or rear extremity is elevated, and in its elevation will be caused to deflect the swinging toe $f^4$, (which is, in fact, but a portion of the action-lever considered as a compound lever,) which toe makes pivotal connection with the pawl-carrier Q, and by its own deflection under the lifting thrust of the action-lever occasions the movement of said carrier and its pawl away from the rack of the platen-carrier. In this construction it is, of course, to be understood that the heel-plate of the action-lever extends completely across the machine beneath all of the keys, and is at its extremity farthest from the heel $f$ of the action-lever supported by a counterpart heel or lever-rocker similar to that employed for the support of the lever-rocker rod $f^2$ in the construction first described. In this construction, moreover, as will be apparent, the position-levers are inverted, as in the construction of Figs. 14 and 15, and pivoted at I<sup>x</sup> in the upper portion of the frame-work. In this construction, again, the pawl-carrier and hammer-slide are shown as connected by a pawl-lever P, as in said first-named construction. The entire construction is illustrated with a view to making apparent the fact that the keys which operate the position-levers and the action-lever need not necessarily themselves be levers, but may as well, and by the simplest modifications obvious to any mechanic, be slide-bars.

Having now described several embodiments of our invention, all of which illustrate its salient principle of the provision of position-levers controlled by keys adapted not only during the first part of their stroke to deflect said levers and by such deflection to occasion the rotation of the wheel-shaft and wheel, but adapted also during the last portion of their stroke or throw to deflect an action-lever operative, either by any preferred connecting mechanism or by virtue of any preferred form of itself, upon the mechanism for actuating the platen-carrier to occasion the predetermined feed of the platen, and also upon the mechanism for striking the types to imprint the paper. We ought also to remark that while we have preferred to illustrate and describe a wheel-shaft provided with a single position-plate the surface of which is a single plane and position-levers provided with deflecting-plates, the position-plate striking-surface of which is, as to the plate of each lever, differently inclined, so that the striking-faces of no two levers are parallel, it is perfectly easy for us to form all of the deflecting-plates with striking-faces having a common inclination—that is to say, when at rest being all parallel with each other—and apply to the shaft a series of separate and independent position-plates, each of which occupies a plane different from that of every other plate, as shown in Fig. 22, the same being an obvious modification set forth at length in both of the Schuckers applications referred to.

Having thus described our invention, we claim—

1. In a type-writing machine, the combination of a key, a position-lever operated by the movement of said key, a shaft within the range of the movement of and adapted to be rotated by said position-lever, the plane of movement of the lever being transverse to the shaft, a type-wheel carried by said shaft, and mechanism operated by the movement of said key for producing the impression without movement of the type-wheel, substantially as described.

2. In a type-writing machine, the combination of a key, a position-lever operated by the movement of said key, a shaft within the range of the movement of and adapted to be rotated by said position-lever, the plane of movement of the lever being transverse to the shaft, a type-wheel carried by said shaft, a hammer, and connections between the hammer and said key, whereby the movement of the said key operates the hammer, substantially as described.

3. In a type-writing machine, the combination of a key, a position-lever operated by the movement of said key, a shaft within the range of the movement of the position-lever and provided with a position-plate adapted to be engaged by the position-lever on both sides of the axis of the shaft, a type-wheel carried by said shaft, a hammer, and connections between the hammer and said key, whereby the movement of the key operates the hammer, substantially as described.

4. In a type-writing machine, the combination of a key, a position-lever operated by the movement of said key, a shaft within the range of the movement of and adapted to be rotated by said position-lever, the plane of movement of the lever being transverse to the shaft, a type-wheel carried by the shaft and having movable types, a type-hammer for advancing said types, a platen and platen-carrier, and mechanism operated on the movement of the said key for successively actuating the hammer and advancing the platen-carrier, substantially as described.

5. In a type-writing machine, the combination of a key, a position-lever operated by the movement of said key, a shaft within the range of the movement of and adapted to be rotated by said position-lever, the plane of movement of the lever being transverse to the shaft, a type-wheel carried by the shaft and having movable types, a type-hammer for advancing said types, a platen and platen-carrier, an action-lever operated by said key, and mechanism operated on the movement of the action-lever for successively actuating the hammer and advancing the platen-carrier, substantially as described.

6. In a type-writing machine, the combination of a position-lever, a shaft within the range of the movement of and adapted to be rotated by said position-lever, a type-wheel carried by said shaft, and a key operating said position-lever by means of a cam-surface, the key having a further movement after the type-wheel is positioned and the cam-face of the key has passed out of engagement with the part by which it operates the position-lever, substantially as described.

7. In a type-writing machine, the combination of a position-lever, a shaft within the range of the movement of and adapted to be rotated by said position-lever, a type-wheel carried by said shaft, and a pivoted key operating said position-lever by means of a cam-surface, the key having a further movement after the type-wheel is positioned and the cam-face of the key has passed out of engagement with the part by which it operates the position-lever, substantially as described.

8. In a type-writing machine, the combination of a position-lever, a shaft within the range of the movement of and adapted to be rotated by said position-lever, a type-wheel carried by said shaft, and a key operating said position-lever by means of a cam-surface, the cam being provided with an extended straight face, whereby the position-lever and type-wheel are first actuated and then locked in position during the further movement of the key, substantially as described.

9. In a type-writing machine, the combination of a position-lever, a shaft within the range of the movement of and adapted to be rotated by said position-lever, a type-wheel carried by said shaft, a key operating said position-lever in the first part of its movement by means of a cam-surface, the cam being provided with an extended straight face, and impression and feeding mechanism operated by the further movement of the key, whereby the position-lever and the type-wheel are first actuated and then locked in position during the operation of the impression and feeding mechanism, substantially as described.

10. In a type-writing machine, the combination of a series of keys, a corresponding series of position-levers operated by the keys, a shaft within the range of the movement of and adapted to be rotated by each of said position-levers, the engaging surfaces of the shaft and different levers varying in inclination, a type-wheel carried by said shaft, and a hammer operated by the movement of any one of the keys, substantially as described.

11. In a type-writing machine, the combination of a series of keys, a corresponding series of position-levers operated by the keys, a shaft within the range of the movement of and adapted to be rotated by each of said position-levers, the operating-surfaces of the different levers varying in inclination, a type-wheel carried by said shaft, and a hammer operated by the movement of any one of the keys, substantially as described.

12. In a type-writing machine, the combination of a series of keys, a corresponding series of position-levers operated by the keys, a shaft within the range of the movement of and adapted to be rotated by each of said position-levers, the plane of movement of the position-levers being transverse to the shaft, a type-wheel carried by said shaft and having movable types, and a type-hammer operated by the movement of any one of said keys, substantially as described.

13. In a type-writing machine, the combination of a series of keys, a corresponding series of position-levers operated by the keys, a shaft within the range of the movement of and adapted to be rotated by each of said position-levers, the plane of movement of the position-levers being transverse to the shaft, a type-wheel carried by said shaft and having movable types, a type-hammer, a platen and platen-carrier, and mechanism operated on the movement of any one of said keys for successively actuating the hammer and advancing the platen-carrier, substantially as described.

14. In a type-writing machine, the combination of a series of keys, a corresponding series of position-levers operated by the keys, a shaft within the range of the movement of and adapted to be rotated by each of said position-levers, the plane of movement of the position-levers being transverse to the shaft, a type-wheel carried by said shaft and having movable types, a type-hammer, a platen and platen-carrier, and an action-lever actuated by each of said keys and connected to the hammer and platen operating mechanism, substantially as described.

In testimony that we claim the foregoing as our invention we hereunto sign our names this 12th day of August, A. D. 1889.

JACOBS W. SCHUCKERS.
MARTIN O. REHFUSS.

Witnesses:
JOHN J. BRADLEY,
A. HOSBACH.